United States Patent
Provine et al.

(10) Patent No.: US 7,370,119 B2
(45) Date of Patent: May 6, 2008

(54) SCALABLE MPLS FAST REROUTE SWITCHOVER WITH REDUCED COMPLEXITY

(75) Inventors: Joseph Provine, Santa Clara, CA (US); Santhosh Thodupunoori, San Jose, CA (US); John Bettink, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 662 days.

(21) Appl. No.: 10/850,681

(22) Filed: May 21, 2004

(65) Prior Publication Data

US 2006/0031490 A1  Feb. 9, 2006

(51) Int. Cl.
G06F 15/173 (2006.01)
H04L 12/28 (2006.01)
H04L 12/56 (2006.01)

(52) U.S. Cl. ............... 709/239; 370/392; 370/393; 709/242

(58) Field of Classification Search ............... 709/239, 709/242; 370/392–393
See application file for complete search history.

(56) References Cited

U.S. PATENT DOCUMENTS

| | | | | |
|---|---|---|---|---|
| 6,813,242 B1* | 11/2004 | Haskin et al. | | 370/229 |
| 6,895,441 B1* | 5/2005 | Shabtay et al. | | 709/238 |
| 6,904,018 B2* | 6/2005 | Lee et al. | | 370/238 |
| 6,928,050 B2* | 8/2005 | Lynch et al. | | 370/224 |
| 7,058,845 B2* | 6/2006 | Fujita | | 714/4 |
| 2002/0003797 A1* | 1/2002 | Rautenberg | | 370/389 |
| 2002/0060985 A1* | 5/2002 | Lee et al. | | 370/216 |
| 2002/0112072 A1* | 8/2002 | Jain | | 709/239 |
| 2002/0116669 A1* | 8/2002 | Jain | | 714/43 |
| 2002/0133756 A1* | 9/2002 | Jain | | 714/43 |
| 2003/0002444 A1* | 1/2003 | Shin et al. | | 370/238 |
| 2003/0016664 A1* | 1/2003 | MeLampy et al. | | 370/389 |
| 2003/0108029 A1* | 6/2003 | Behzadi | | 370/351 |
| 2003/0110287 A1* | 6/2003 | Mattson | | 709/238 |
| 2003/0210705 A1* | 11/2003 | Seddigh et al. | | 370/419 |
| 2003/0229807 A1* | 12/2003 | Qiao et al. | | 713/200 |
| 2004/0109687 A1* | 6/2004 | Park et al. | | 398/57 |
| 2004/0114595 A1* | 6/2004 | Doukai | | 370/389 |
| 2005/0073958 A1* | 4/2005 | Atlas et al. | | 370/238 |
| 2005/0088965 A1* | 4/2005 | Atlas et al. | | 370/216 |
| 2005/0188100 A1* | 8/2005 | Le Roux et al. | | 709/238 |

OTHER PUBLICATIONS

Vasseur, Jean Philippe et al. "Definition of an RRO node-id subobject", IETF Internet Draft, draft-ietf-mpls-nodeid-subobject-00.txt, Feb. 2003, 7 pages.*

Haskin, Dimitry et al. "A Method for Setting an Alternative Label Switched Paths to Handle Fast Reroute", IETF Internet Draft, drafi-haskin-mpls-fast-reroute-05.txt, Nov. 2000, 10 pages.*

Gan, Der-Hwa et al. "A Method for MPLS LSP Fast-Reroute Using RSVP Detours", IETF Internet Draft, draft-gan-fast-reroute-00.txt, Apr. 10, 2001, 12 pages.*

(Continued)

Primary Examiner—George C. Neurauter, Jr.
(74) Attorney, Agent, or Firm—Cindy Kaplan

(57) ABSTRACT

A Fast Reroute implementation suitable for use in a label switched router. Reroute from protected tunnels to backup tunnels may be achieved in constant time irrespective of the numbers of protected forwarding equivalence classes and protected tunnels.

15 Claims, 6 Drawing Sheets

OTHER PUBLICATIONS

Ashwood-Smith, et al., "Generalized MPLS Signaling—RSVP-TE Extensions," Internet Draft, Internet Engineering Task Force, Oct. 2001.

Awduche, et al., "Requirements for Traffic Engineering Over MPLS," RFC 2702, Internet Engineering Task Force, Sep. 1999.

Braden, et al. "Resource ReSerVation Protocol (RSVP)-Version 1 Functional Specification," RFC 2205, Internet Engineering Task Force, Sep. 1997.

Pan, et al., "Fast Reroute Techniques in RSVP-TE," Internet Draft, Internet Engineering Task Force, Nov. 2001.

E. Rosen, et al., "Multiprotocol Label Switching Architecture," RFC 3031, Internet Engineering Task Force, Jan. 2001.

* cited by examiner

Egress Forwarding Data Structures

SCALABLE MPLS FAST REROUTE SWITCHOVER WITH REDUCED COMPLEXITY

STATEMENT OF RELATED APPLICATIONS

The present invention is related to the subject matter of U.S. application Ser. No. 10/679,981 filed on Oct. 7, 2003, and entitled "ENHANCED SWITCHOVER FOR MPLS FAST REROUTE," the contents of which are herein incorporated by reference in their entirety for all purposes.

BACKGROUND OF THE INVENTION

The present invention is related to data networking and more particularly to systems and methods for rerouting around failed links and/or nodes.

The Internet and IP networks in general have become enablers for a broad range of business, government, and personal activities. The Internet is being relied upon as a general information appliance, business communication tool, entertainment source, and as a substitute for traditional telephone networks and broadcast media. As the Internet expands its role, users become more and more dependent on uninterrupted access.

To assure rapid recovery in the event of failure of a network link or node, so-called "Fast Reroute" techniques have been developed. In a network employing Fast Reroute, traffic flowing through a failed link or node is rerouted through one or more preconfigured backup tunnels. The preconfigured backup tunnels facilitate a key goal of Fast Reroute techniques, the redirection of interrupted traffic within tens of milliseconds. This minimizes impact on the user experience.

The Fast Reroute techniques have been developed in the context of MPLS (Multiprotocol Label Switching) Traffic Engineering where traffic flows through label switched paths (LSPs) configured to have guaranteed bandwidth under certain conditions. When an element such as a link or node fails, all of the Traffic Engineering LSPs (also referred to as "tunnels") using that failed element are redirected through preconfigured backup tunnels that route around the impacted segments of the LSPs. These backup tunnels are generally used only for a very short time since simultaneously with the rerouting through the backup tunnels, the head ends of all the affected primary tunnels are notified of the failure. This causes the head ends to reroute the primary tunnels around the failures so that the backup tunnels are no longer needed.

A key aspect of meeting the reliability and quality of service objectives of Fast Reroute is the switchover time from the failed segments of the protected primary tunnels to their preconfigured backup tunnels. Once a failure occurs, all of the protected traffic should be rerouted within 50 milliseconds to avoid or minimize impact on the user experience. This is a formidable task considering that the failed link may carry, e.g., 10 Gbps, 40 Gbps. There may be thousands of protected tunnels to be rerouted into a backup tunnel. The protected traffic to be rerouted may also correspond to numerous forwarding equivalence classes. Typically forwarding state within a router is represented as entries corresponding to individual forwarding equivalence classes and/or LSPs. Updating this forwarding state so that a backup tunnel will be used requires updating many of these entries. Thus the time taken to update forwarding state will vary with either the number of affected forwarding equivalence classes, the number of affected LSPs, or both. When there are large numbers of affected forwarding equivalence classes and/or LSPs, it is very difficult to meet the 50 millisecond objective.

What is needed are readily scaleable systems and methods for accelerating the switchover to preconfigured backup tunnels upon failure of a protected link or node while retaining desired features of router forwarding data structures.

SUMMARY OF THE INVENTION

Embodiments of the present invention provide a Fast Reroute implementation suitable for use in a label switched router. Reroute from protected tunnels to backup tunnels may be achieved in constant time irrespective of the numbers of protected forwarding equivalence classes and protected tunnels.

One aspect of the present invention provides a method for handling a failure at a router. The method includes: detecting the failure, in response to the failure modifying forwarding data structure entries storing information pertaining to a first output adjacency affected by the failure, and thereafter, based on the modification, forwarding protected traffic previously handled by the first output adjacency via a backup tunnel employing a second output adjacency. A time required for the modification is independent of a number of protected tunnels employing the first output adjacency and independent of a number of protected forwarding equivalence classes employing the first output adjacency.

Further understanding of the nature and advantages of the inventions herein may be realized by reference to the remaining portions of the specification and the attached drawings.

DESCRIPTION OF SPECIFIC EMBODIMENTS

The present invention will be described with reference to an exemplary label switched router (LSR) in a representative network. The LSR may be, e.g., an edge router or interior router of an MPLS network. The present invention, however, can be applied to a wide variety of network devices and network configurations.

At the head-end of a label-switched path (LSP), one or more labels are assigned to each incoming packet before forwarding the packet to the next-hop node. At each intermediate node, a forwarding selection and a new substitute label are determined based on the label found in the received packet. At the LSP tail end (or one hop prior), a forwarding decision is made based on the incoming label but no label is included when the packet is sent on to the next hop. Label switched paths (LSPs) effectively operate as tunnels through the network. The LSPs are constructed by the control plane by distributing labels and other information used to make forwarding decisions among the network nodes.

One highly useful type of LSP is an MPLS Traffic Engineering LSP. Traffic Engineering LSPs provide end-to-end guaranteed bandwidth and are highly useful in providing Quality of Service (QoS) guarantees and in providing, e.g., voice and video services. So that Traffic Engineering LSPs continue to operate in the event of failure, MPLS Fast Reroute has been developed. Local backup tunnels (also implemented as LSPs) are used to reroute the traffic of a protected Traffic Engineering LSP around the failure. A single backup tunnel may protect many Traffic Engineering LSPs. A single backup tunnel may protect all the Traffic Engineering LSPs exiting a particular output interface or the Traffic Engineering LSPs may be divided among multiple backup tunnels. To protect a link, a backup tunnel is established connecting the two nodes that the protected link connects without including the protected link in the backup tunnel. To protect a node, a backup tunnel protects each pair of links traversing the node.

There are many other services that LSPs can provide including, e.g., ATM or Frame Relay virtual circuits, layer 2 VPNs, etc. A single packet may be traversing more than one LSP simultaneously, e.g., both an MPLS Traffic Engineering tunnel and an MPLS Fast Reroute backup tunnel around a failure. Thus a packet may travel with more than one label in its label stack, the highest label(s) being used for forwarding decisions at a particular node.

Figure 1:
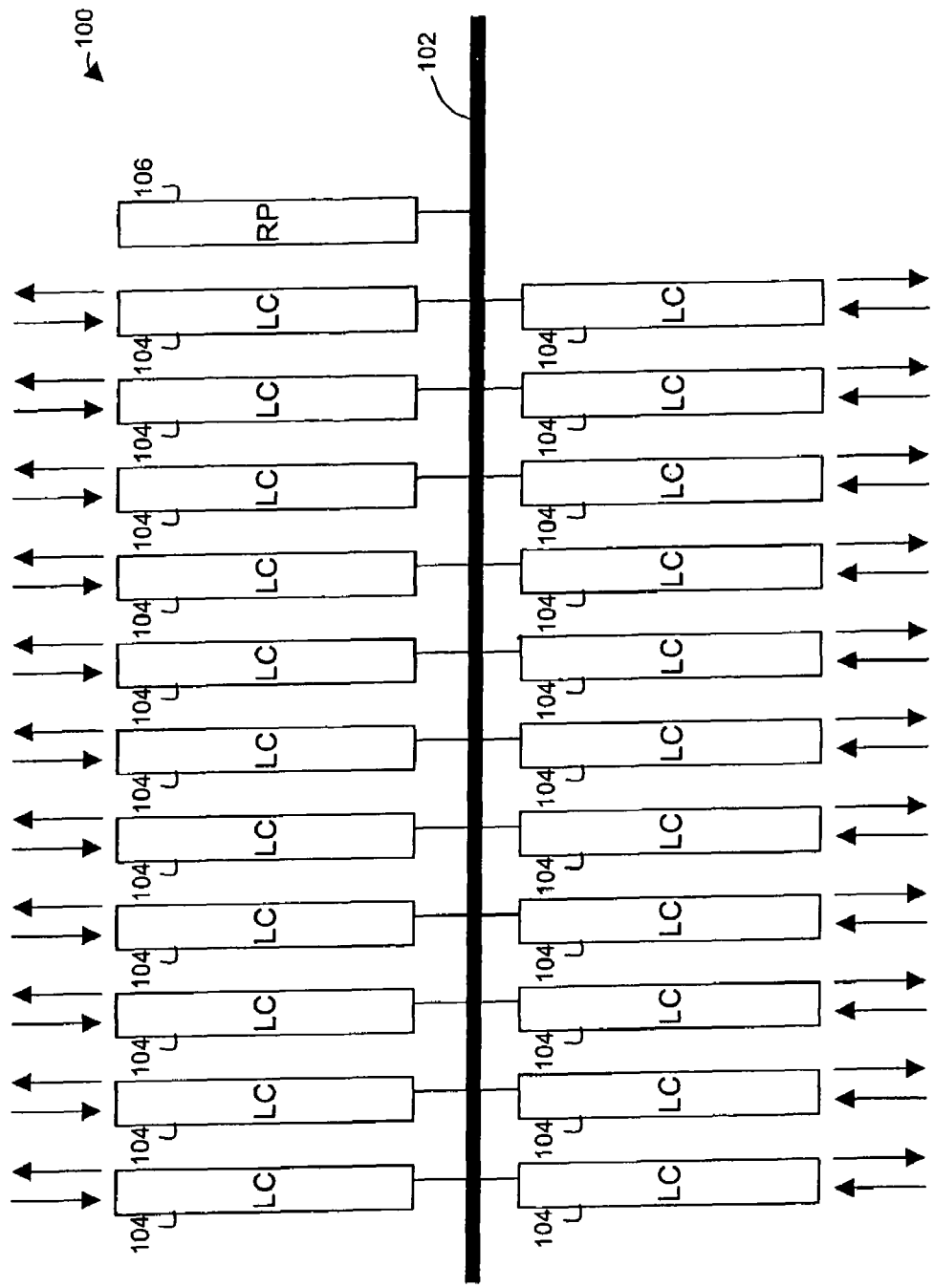
FIG. 1 depicts a label switched router according to one embodiment of the present invention.

FIG. 1 depicts a router 100 according to one embodiment of the present invention. Router 100 includes multiple linecards 104 interconnected by a switching fabric 102. Router 100 further includes a route processor 106. Route processor 106 handles control plane processing and implements well-known protocols such as BGP, LDP, RSVP, etc. Forwarding operations are handled on the linecards 104. Each linecard 104 has an interface to switching fabric 102 and input/output interfaces. Possible input/output interfaces include, e.g., 1×OC768 (40 Gbps SONET/SDH)interface, 4×OC192 (10 Gbps SONET/SDH) interface, 32×Gigabit Ethernet, 8×10 Gigabit Ethernet, etc.

Network device 100 operates in accordance with various protocols including, e.g., TCP/IP, MPLS, MPLS Traffic Engineering, MPLS Fast Reroute, etc. The following documents (and other documents referenced by these documents) define protocols that may be practiced by network device 100.

E. Rosen, et al., "Multiprotocol Label Switching Architecture," RFC 3031, Internet Engineering Task Force, January 2001.

Braden, et al. "Resource ReSerVation Protocol (RSVP)-Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Ashwood-Smith, et al., "Generalized MPLS Signaling—RSVP-TE Extensions," Internet Draft, Internet Engineering Task Force, October 2001.

Pan, et al., "Fast Reroute Techniques in RSVP-TE," Internet Draft, Internet Engineering Task Force, October 2001.

The contents of the above documents are incorporated herein by reference in their entirety for all purposes.

Figure 2:
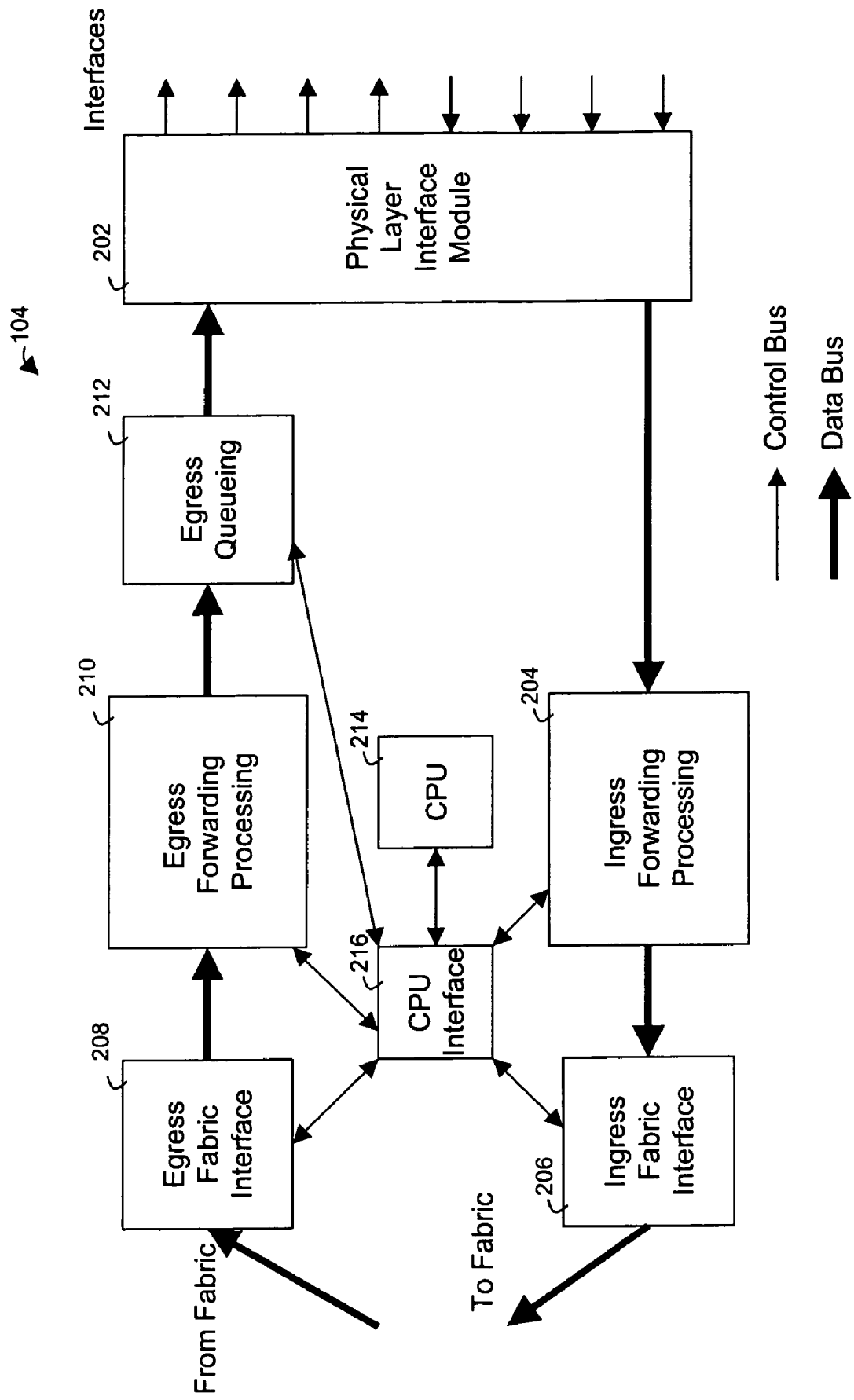
FIG. 2 depicts hardware of a linecard of the router of FIG. 1 according to one embodiment of the present invention.

FIG. 2 depicts details of one of linecards 104 according to one embodiment of the present invention. A physical line interface module (PLIM) 202 incorporates the necessary physical layer functionality for sending and receiving packets over the appropriate physical medium. PLIM 202 is adapted to operate in accordance with the relevant layer 1 and layer 2 standards. For example, PLIM 202 may implement multiple Gigabit Ethernet interfaces, 10-Gigabit Ethernet interfaces, etc. PLIM 202 thus may have multiple physical input and output interfaces. Furthermore, it will be understood that a single physical interface may incorporate multiple logical interfaces to support services such as virtual local area networks.

Packets received by PLIM 202 are sent to an ingress forwarding processing block 204. Ingress forwarding processing block 204 performs a portion of the lookups based on the packet's forwarding equivalence class and resulting forwarding decisions. In the MPLS context, ingress forwarding processing block 204 may be responsible for imposing, swapping, or popping labels such as VPN labels, Any Transport over MPLS (AToM) labels, BGP labels, IGP multiarea labels, etc. Ingress forwarding processing block 204 will also select the linecard that will be used to output the packet from router 100 and also possibly a queue on that line card. Ingress forwarding processing block 204 also performs functions such as, e.g., QoS classification, input policing and marking, etc. Further details of ingress forwarding data structures and operations will be presented below with reference to FIG. 3.

Packets are forwarded from ingress forwarding processing block 204 to an ingress fabric interface 206. Ingress fabric interface 206 performs various functions to prepare packets for transport across switch fabric 102. Some packets will arrive and depart from the same linecard but these will also traverse switch fabric 102. Data arriving from switch fabric 102 is handled by an egress fabric interface 208.

An egress forwarding processing block 210 receives packets output by egress fabric interface 208. Egress forwarding processing block 210 performs remaining lookups and forwarding decisions. In the MPLS context, egress forwarding processing block 210 is responsible for imposing, swapping or popping labels for, e.g., MPLS Traffic Engineering, MPLS Fast Reroute, etc. Forwarding operations are thus distributed between ingress forwarding processing block 204 and egress forwarding processing block 210 to optimize scalability. Egress forwarding processing block 210 is also responsible for, e.g., output QoS classification, output policing and marking, output QoS queue selection.

Packets are sent from egress forwarding processing block 210 to a particular queue in an egress queuing block 212. Egress queuing block 212 maintains groups of queues for each logical sub-interface of the physical output interfaces maintained by PLIM 202.

A CPU 214 handles overall control tasks for the linecards and also handles certain exception packets. CPU 214 interfaces with egress fabric interface 208, ingress fabric interface 206, egress forwarding processing block 210 and ingress forwarding processing block 204 via a CPU interface 216. CPU 214 maintains master forwarding data structures. These data structures are updated in response to routing updates from route processor 106. Updates are then propagated to data structures in the forwarding processing blocks 210 and 204 via CPU interface 216.

The forwarding processing blocks 204 and 210 can be implemented in various ways, e.g., as general purpose programmable processors, as pipelined processors, etc. In another possible implementation, the forwarding processing blocks each incorporate numerous packet processing elements for performing forwarding operations in parallel. In this type of implementation, when a packet arrives at the forwarding processing block it is assigned to one of the packet processing elements. The forwarding processing blocks make successive lookups to data structures as will be explained to retrieve information necessary to encapsulate the packet and make decisions as to its handling upon exiting the forwarding processing block. After these lookups are complete, the packet is assembled with the necessary headers, labels, encapsulation, etc. and outputs the packet to the appropriate queue.

The forwarding processing blocks execute code instructions or microcode instructions. CPU 214 executes code instructions. These instructions are stored on a computer-readable storage medium that may form a part of the integrated circuit used to implement the forwarding processing block, CPU, etc. New instructions to load could also be stored on a computer-readable storage medium such as, e.g., a CD-ROM, floppy disk, DVD-ROM, etc. A signal traveling over the Internet itself or some other network is an example of a transmission medium.

Figure 3:
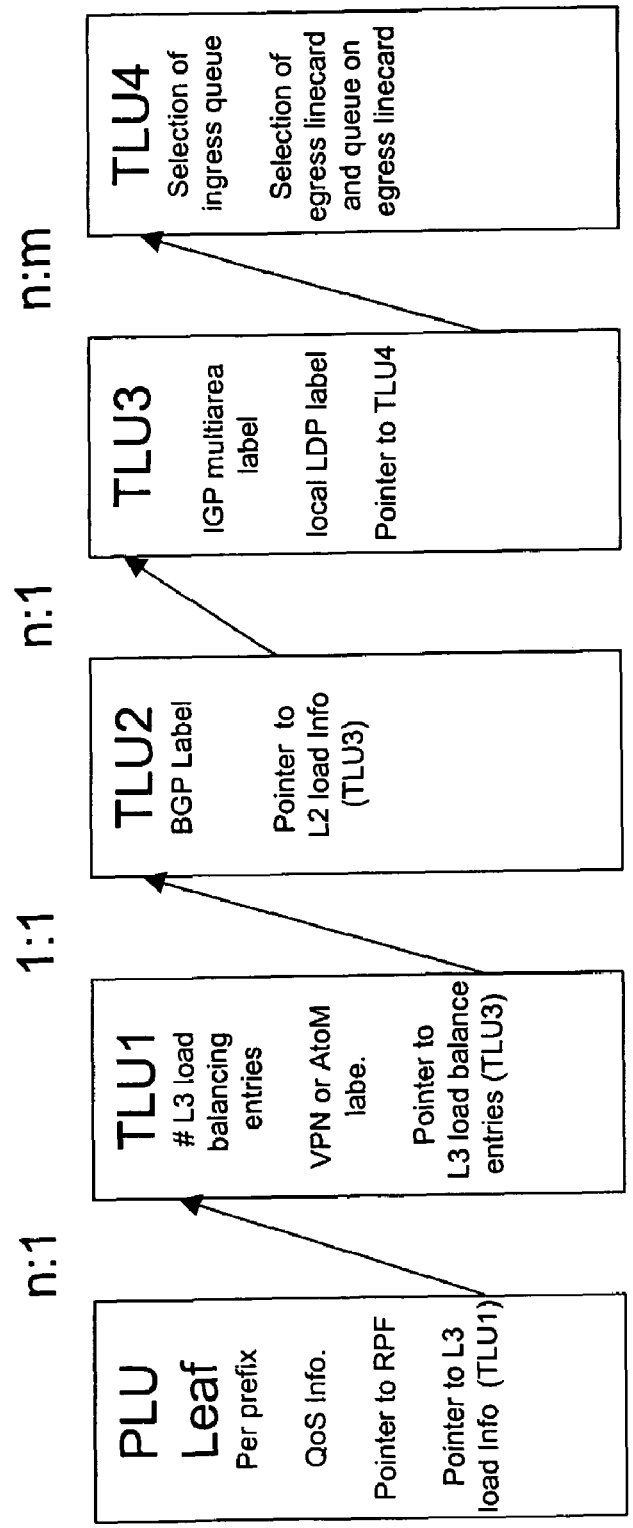
FIG. 3 depicts ingress forwarding data structures according to one embodiment of the present invention.

FIG. 3 depicts forwarding data structures consulted by the packet processing elements within ingress forwarding processing block 204. A first lookup is performed in a prefix lookup (PLU) memory within block 204. Based on the results of this lookup, further successive lookups are performed in a table lookup (TLU) memory within block 204. Each lookup retrieves a pointer used to find the results of the next lookup. The consulted entries thus essentially form a linked list.

FIG. 3 shows representative data items retrieved in each lookup. The first lookup is to the PLU and is based on a destination prefix or topmost label of the packet. The PLU incorporates a tree data structure to facilitate the well-known longest match lookup technique. The result, referred to as a PLU leaf, includes, one or more of, e.g., QoS information for the prefix, a pointer to a first table TLU1 in the TLU and also a reference to an RPF (reverse path forwarding) table used in making multicast routing decisions.

Multiple entries in the PLU may point to the same entry in TLU1. Representative contents of TLU1 can include # of entries in TLU2 corresponding to layer 3 routes over which traffic is divided, a VPN or AToM label, and a pointer to a first of one or more entries in TLU2. The reference to the load balance entry in TLU2 is a sum of the pointer and the result of a suitable hash algorithm applied to the packet.

Representative contents of an entry in TLU2 include a BGP label to swap or impose and a pointer to table TLU3. Multiple entries in TLU2 can point to the same entry in TLU3. Representative contents of a TLU3 entry include a pointer to TLU4, an IGP multiarea label, and a local LDP label. A TLU4 entry can include, e.g., a selection of queues within ingress fabric interface 206, a selection of egress linecard and a selection of queue in egress fabric interface 208 to correspond to a particular output interface. There may be one ingress TLU4 entry for each possible output interface. However, if multiple backup tunnels protect MPLS traffic engineering LSPs of the same output interface there will be an ingress TLU4 entry for each combination of output interface and protecting backup tunnel.

Figure 4:
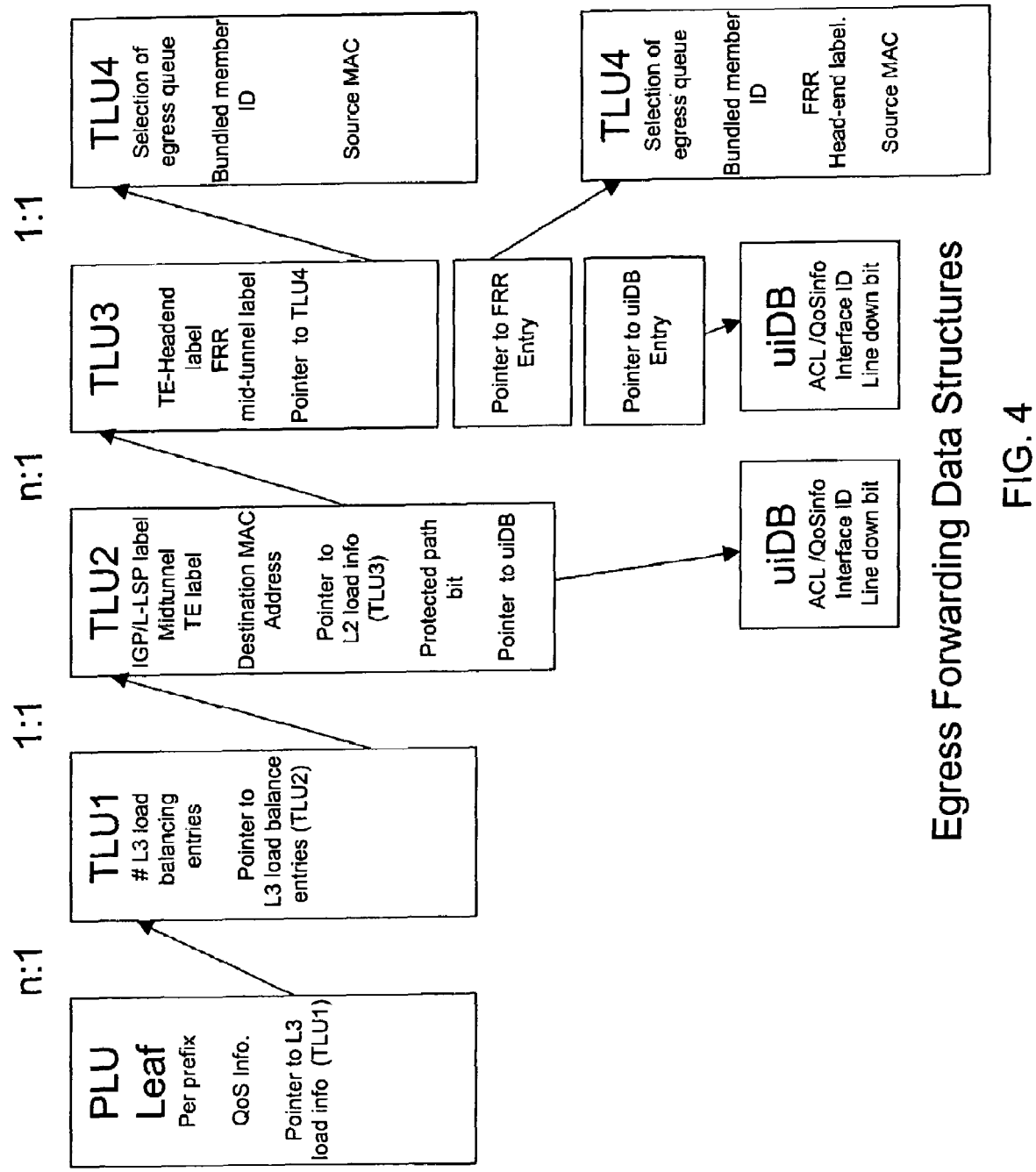
FIG. 4 depicts egress forwarding data structures according to one embodiment of the present invention.

FIG. 4 depicts egress forwarding data structures as employed by the packet processing elements of egress forwarding processing block 210. Block 210 also includes a PLU memory and a TLU memory. There is also a micro-interface database (uiDB) with entries for each output interface (including logical interfaces). (The ingress data structures also incorporate a uiDB for the input interfaces but this is not relevant to the discussion here.) For a new packet arriving on the egress side, the first reference is to the PLU to retrieve a PLU leaf based on destination address or topmost label. Representative contents of the PLU leaf include QoS information and a pointer to table TLU1 in the TLU. Multiple PLU leaves can point to the same entry in TLU1.

An entry in TLU1 includes, e.g., the # of layer 3 routes over which traffic is being divided for this prefix and a pointer to a first load balancing entry in TLU2. The actual reference to TLU2 is taken as the sum of the pointer and the result of a suitable hashing algorithm. Representative contents of the TLU2 entry include, e.g., the destination MAC address, a pointer to table TLU3, and a pointer to the uiDB. Labels available in the TLU2 entry may include an IGP and/or L-LSP label and a Traffic Engineering label as would be swapped at a midpoint of the tunnel rather than one imposed at the head end. According to embodiments of the present invention, the TLU2 entry also includes a protected path bit to indicate whether a referenced MPLS Traffic Engineering tunnel is protected by one or more MPLS Fast Reroute backup tunnels.

Multiple TLU2 entries can point to the same TLU3 entry. A TLU3 entry may include e.g., a Traffic Engineering head-end label and/or a Fast Reroute midtunnel label, and a pointer to the TLU4 entry. According to embodiments of the present invention, there are additional TLU3 entries directly after the referenced TLU3 entry to facilitate Fast Reroute. A TLU3 FRR entry includes a pointer to a TLU4 entry corresponding to the backup tunnel. This TLU3 FRR entry also includes the other information of the base TLU3 entry. The next TLU3 entry is a protected interface entry that includes a pointer to the uiDB for the protected interface used by the backup tunnel. This last egress TLU3 entry does not preferably include other information found in the previous egress TLU3 entries. For tunnels that are not protected by Fast Reroute, the additional TLU3 entries may be empty.

A TLU4 entry is selected based on the pointer in TLU3. The TLU4 entry may include e.g., a selection of queue within egress queuing block 212, a bundled member ID to identify a member within a bundled link, a source MAC address, and a Fast Reroute head-end label.

An entry of the uiDB may include access control list (ACL) and QoS information for the specified interface and an interface identifier. According to embodiments of the present invention, the uiDB entry may also include a line down bit which is set when the identified interface goes down due to a failure on the link to which it connects or the node to which that link connects.

The forwarding data structures of FIGS. 3-4 are merely representative. Information has been allocated among the various tables to optimize both forwarding speed within the constraints of the packet processing elements capabilities and to provide scalability so that tunnels and other features can be updated quickly with a minimum of rewrites. The discussion that follows will emphasize only those aspects of the forwarding data structures that are relevant to MPLS Traffic Engineering tunnels and their protection by Fast Reroute. The present invention will be applicable to other forwarding data structures and schemes or modifications of the structures of FIGS. 3-4.

Both ingress and egress data structures are preconfigured for Fast Reroute operation. On the ingress side, there is a TLU4 entry for each combination of output interface and protecting backup tunnel. If only a single backup tunnel protects all of the MPLS Traffic Engineering LSPs exiting via an output interface then there is only one associated TLU4 entry used for normal forwarding.

Preprogrammed egress side Fast Reroute forwarding information includes the previously mentioned protected path bit in the TLU2 entry, additional TLU3 entries, and line status down bit in the uiDB. TLU4 entries are preprogrammed for all backup tunnels exiting the linecard. Where there is a backup tunnel that is hosted but the protected Traffic Engineering LSP is not hosted, the full forwarding chain for the backup tunnel is preconfigured and ready for use. In this case, the TLU2 entries of the protected tunnels are preconfigured to point to the TLU3 FRR entry rather than the base TLU3 entry which may be empty. The TLU3 FRR entry in turn points to the TLU4 entry holding the Fast Reroute label to impose.

Figure 5:
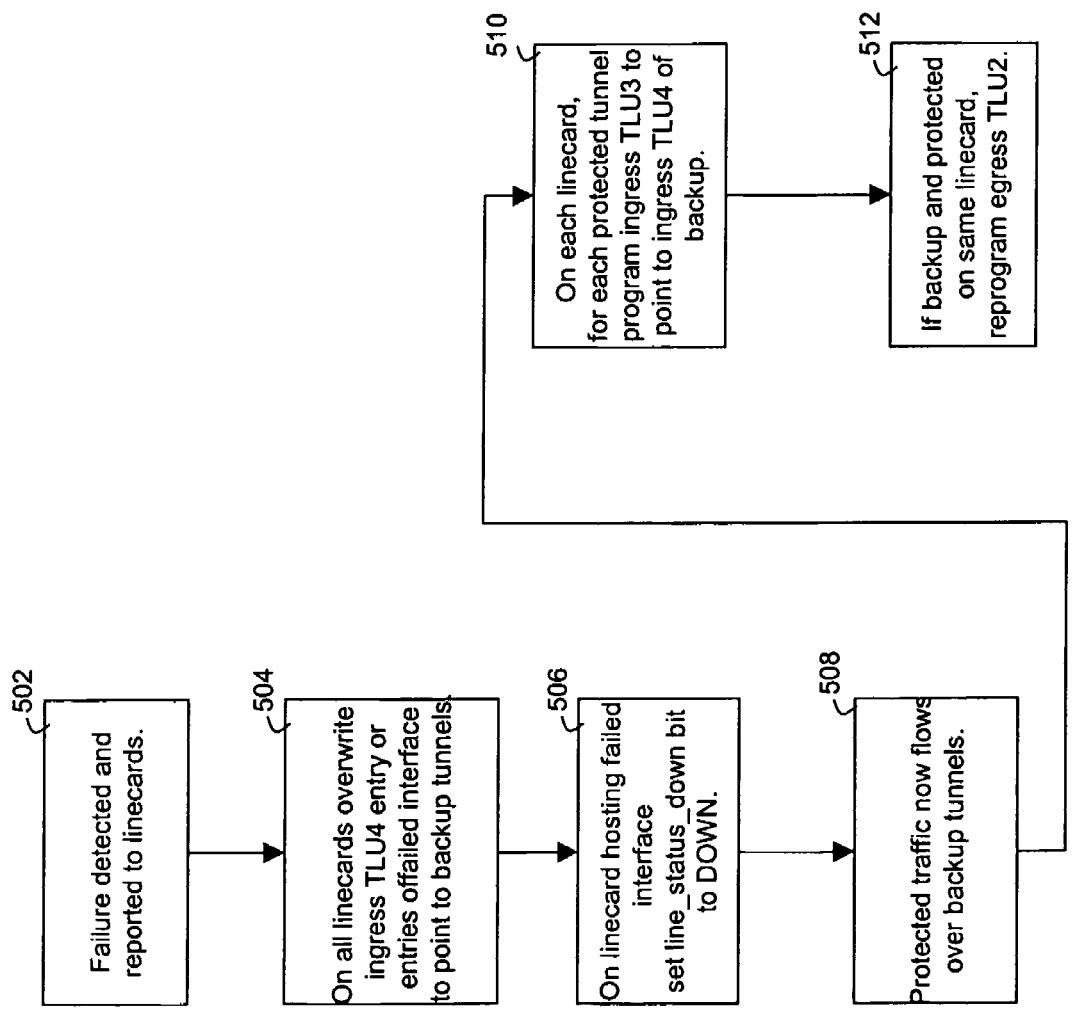
FIG. 5 is a flowchart describing steps of switching over traffic between protected tunnels and backup tunnel(s) after a failure according to one embodiment of the present invention.

FIG. 5 is a flowchart describing steps of switching over traffic according to one embodiment of the present invention. At step 502, the failure is detected. Many suitable failure detection mechanisms are available. A first linecard detects a failure of an output interface hosting one or more protected tunnels. This first linecard reports the failure to all of the linecards of the router via the switching fabric. Alternatively, the linecard experiencing a failure reports this failure to route processor 106 or some other management entity of the router which then distributes the information where it is needed.

At step 504, the ingress data structure of every linecard in the router is updated. The ingress TLU4 entry or entries corresponding to the failed output interface are overwritten to point to the egress linecard and output interface hosting the backup tunnel. If there are multiple TLU4 entries for the failed output interface then each entry will be rewritten to point to the egress card and output interface hosting the backup tunnel associated with the entry. After this ingress data structure rewrite is complete, switchover is complete even for protected traffic that employs a backup tunnel on a different linecard than the one that hosts the protected Traffic Engineering LSPs. The rewritten TLU4 entries will send the protected traffic (and the unprotected traffic) to the egress linecard hosting the backup tunnel. For the most common situation of one backup tunnel or a very small number of backup tunnels per protected (or partially protected) output interface, this update occurs in constant time. The overall update complexity can approach O(n) where n is the number of protected tunnels only in highly unlikely situations.

At step 506, the linecard experiencing the failure sets the line status down bit of the failed interface's entry in the uiDB to DOWN. This action will reroute protected traffic over backup tunnel(s) (if any) that are hosted on the same linecard as protected Traffic Engineering LSP. This operation occurs in constant time independent of the number of protected tunnels or prefixes.

After the initial forwarding updates of steps 504 and 506, protected traffic will flow over the backup tunnels at step 508. However, the forwarding state is untidy in that the rewritten ingress TLU4 entries are being used for handling the rerouted traffic. If there were to be a routing update to a backup tunnel, a TLU4 entry permanently associated with that backup tunnel should be rewritten but such an entry is not yet being used. Furthermore, as will be explained below processing through the egress forwarding data structures is slower than normal. To address these issues, there are further updates.

At step 510, on each linecard, for each protected tunnel the ingress TLU3 entry is reprogrammed to point to an ingress TLU4 entry specific to the backup tunnel. This assures that updates to the backup tunnel are handled correctly.

Step 512 occurs if the failed interface is protected by a backup tunnel hosted by another output interface on the same linecard. At step 512, on the linecard hosting the failed output interface, for each prefix carried by a protected Traffic Engineering tunnel, the TLU2 entry is modified to point to the special TLU3 entry that points to the TLU4 entry of the Fast Reroute tunnel. These TLU2 entries are also modified to point to the uiDB entry of the backup tunnel interface rather than the uiDB entry of the output interface experiencing the failure. After step 512, forwarding lookups occur normally since the host output interface for the backup tunnels will have its entry in the uiDB marked as UP rather than DOWN. The time taken for performing steps 510 and 512 will depend on the number of prefixes and protected tunnels but Fast Reroute protection will already be active after steps 504 and 506 are performed.

The various forwarding data structure updates of FIG. 5 occur first in a master forwarding data structure maintained by CPU 214 and are then propagated to the TLUs of egress forwarding processing block 210 and ingress forwarding processing block 204. To facilitate the updates, CPU 214 maintains a per-output interface list of protected tunnels and the information necessary to identify associated TLU entries to update.

Figure 6:
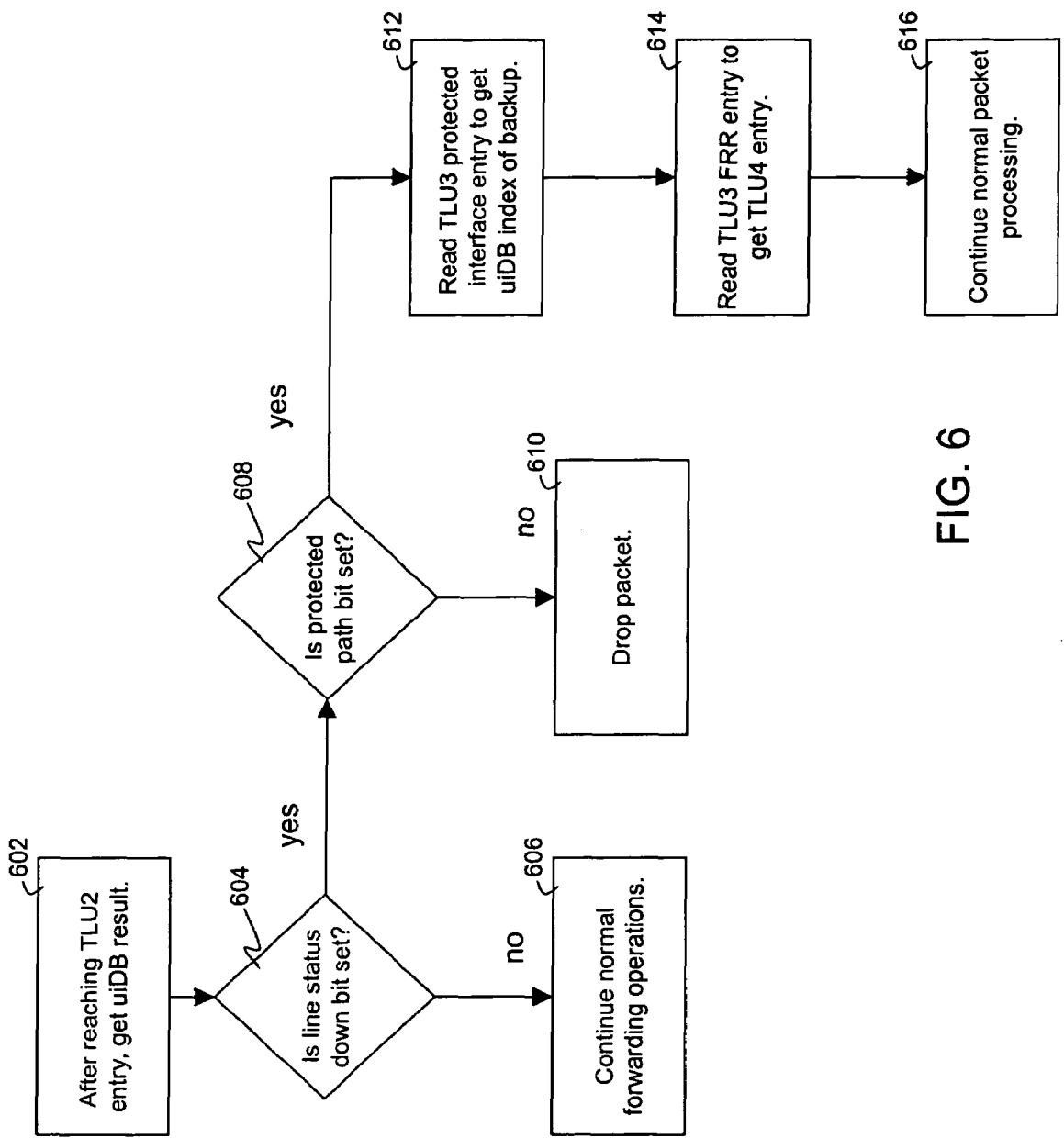
FIG. 6 is a flowchart describing steps of packet processing according to one embodiment of the present invention.

FIG. 6 is a flowchart describing steps of packet processing according to one embodiment of the present invention. FIG. 6 does not represent all of the operations in processing a packet to be forwarded but rather reflects certain modifications made to the operation of egress forwarding processing block 210 to implement rapid Fast Reroute switchover. A step 602 occurs after reaching the lookup of the TLU2 entry during the course of processing a packet. At step 602, the uiDB entry referenced by the TLU2 entry is retrieved normally. Then to accommodate Fast Reroute switchover, the line status down bit of this uiDB entry is tested at step 604. This tests whether the output interface is down due to a failure. If this line status down bit is not set to DOWN, normal forwarding operations including further lookups to TLU2, TLU3, and TLU4 continue at step 606.

If the line status down bit is set to DOWN, then step 608 is reached. Step 608 tests whether the Traffic Engineering tunnel identified by the TLU2 entry has Fast Reroute protection set as indicated by the protected path bit. If the protected path bit is not set, the packet is dropped at step 610 since the unprotected interface is down and there is nowhere to forward the packet. Note that the ingress data structures will send both protected and unprotected traffic to the linecard hosting a backup tunnel and the unprotected traffic will be dropped by the operation of step 610. If the protected path bit is set then step 612 is reached. The TLU2 reference to TLU3 is followed but step 612 specifies an additional operation of reading the TLU3 protected interface entry to retrieve the uiDB reference for the backup tunnel. The backup tunnel's uiDB reference will be used instead of the uiDB reference identified by the TLU2 entry in gathering information to encapsulate the packet and perform various ACL/QoS operations.

Following step 612, a step 614 reads the TLU3 Fast Reroute entry to get the TLU4 entry of the backup tunnel and the other information normally retrieved in TLU3. This is instead of using the TLU4 reference found in the base TLU3 entry. The assembly of the retrieved information to encapsulate and appropriately direct the packet then continues normally at step 616.

It will be seen that steps 608, 612, 614, and 616 will be visited for protected traffic only for the interim period after the line status down bit is set at step 504 but before step 512 is completed. Thus the delays incurred by these steps are only temporary and the Fast Reroute switchover occurs almost immediately. A processor used to implement egress forwarding processing block 210 may use extra clock cycles during the interim period whenever steps 608, 612, 614, and 616 are visited. For the parallel processing case, during the interim period, a packet processing element that visits steps 608, 612, 614, and 616 may be skipped in the next distribution of packets to process to allow for the needed extra time. It is possible to use accelerated hardware to alleviate these delays.

A highly efficient and scalable Fast Reroute switchover technique is thus provided. The switchover typically occurs in constant time and is independent of the number of protected prefixes and tunnels in all of the most common situations. The desirable properties of the forwarding data structures including forwarding speed and scalable update processes are preserved.

The above discussion has assumed that the failure of a link or a node can be characterized as the failure of an output interface used to reach that failed link or node. However, in many types of network a single output interface may be used to reach multiple nodes via, e.g., a shared transmission medium, a lambda switched optical network, etc. It is then more proper to refer to an "adjacency", i.e., the connection to another node, in the context of Fast Reroute protection. Multiple adjacencies may employ the same output interface or input interface. An MPLS Traffic Engineering LSP will be hosted by a given output adjacency and possibly protected by a backup tunnel hosted by another output adjacency.

The previous discussion which assumed a one-to-one relationship between output interfaces and output adjacencies can be understood as a special case of a more generalized structure. References in the text to output interfaces can be understood as referring to a specific type of adjacency where an output interface connects to a point-to-point link and there is thus a one-to-one correspondence between the adjacency and output interface.

The described switchover techniques can be adapted for the generalized case where a given interface may host more than one adjacency. An adjacency database is maintained as part of the egress data structure and there is an entry for each adjacency. The adjacency database entries include information similar to that found in the uiDB. Egress TLU2 entries point to an entry in the adjacency database rather then in the uiDB. The second supplemental TLU3 entry in FIG. 4 points to the adjacency database entry for the backup tunnel rather than the uiDB entry. The line status down bit is also shifted to the adjacency database entries.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, the flowchart steps could be, e.g., deleted, supplemented with other steps, reordered, performed in parallel instead of series, etc. The linked list forwarding data structure could be lengthened or shortened and forwarding information could be shifted among the various tables.

The invention claimed is:

1. In a router, a method for handling a failure, said method comprising:
   detecting said failure;
   in response to said failure modifying forwarding data structure entries storing information pertaining to a first output adjacency affected by said failure; and thereafter
   based on said modification, forwarding protected traffic previously handled by said first output adjacency via a backup tunnel employing a second output adjacency; and
   wherein a time required for said modification is independent of a number of protected tunnels employing said first output adjacency and independent of a number of protected forwarding equivalence classes employing said first output adjacency;
   wherein said router employs a distributed forwarding architecture wherein forwarding processing is divided between an ingress linecard and an egress linecard and modifying forwarding data structure entries further comprises:
   on each linecard of said router, modifying a forwarding data structure entry that previously specified said first output adjacency to now specify said second output adjacency and a linecard hosting said second output adjacency.

2. The method of claim 1 wherein said modifying forwarding data structure entries comprises:
   modifying a table entry specific to said first adjacency to indicate a failed status.

3. The method of claim 1 wherein said first output adjacency and said second output adjacency are hosted on a single linecard.

4. The method of claim 1 wherein said first output adjacency and said second output adjacency are hosted on different linecards.

5. In a router, a method for handling a failure, said method comprising:
   detecting said failure;
   in response to said failure modifying forwarding data structure entries storing information pertaining to a first output adjacency affected by said failure; and thereafter
   based on said modification, forwarding protected traffic previously handled by said first output adjacency via a backup tunnel employing a second output adjacency; and
   wherein a time required for said modification is independent of a number of protected tunnels employing said first output adjacency and independent of a number of protected forwarding equivalence classes employing said first output adjacency and wherein a first output interface hosts only said first output adjacency and no other adjacencies and a second output interface hosts only said second output adjacency and no other adjacencies.

6. For use with a router, a computer program product for handling a failure, said computer program product comprising:
   code that causes detection of said failure;
   code that, in response to said failure, causes modification of forwarding data structure entries storing information pertaining to a first output adjacency affected by said failure;
   code that, based on said modification, causes forwarding of protected traffic previously handled by said first output adjacency via a backup tunnel employing a second output adjacency; and a computer-readable storage medium that stores the codes; and wherein a time required for said modification is independent of a number of protected tunnels employing said first output adjacency and independent of a number of protected forwarding equivalence classes employing said first output adjacency;

wherein said router employs a distributed forwarding architecture wherein forwarding processing is divided between an ingress linecard and an egress linecard and said code that causes forwarding data structure entries further comprises:

code on each linecard of said router that causes modification of a forwarding data structure entry that previously specified said first output adjacency to now specify said second output adjacency and a linecard hosting said second output adjacency.

7. The computer program product of claim 6 wherein said code that causes modification of forwarding data structure entries comprises:

code that causes modification of a table entry specific to said first adjacency to indicate a failed status.

8. The computer program product of claim 6 wherein said first output adjacency and said second output adjacency are hosted on a single linecard.

9. The computer program product of claim 6 wherein said first output adjacency and said second output adjacency are hosted on different linecards.

10. For use with a router, a computer program product for handling a failure, said computer program product comprising:

code that causes detection of said failure;

code that, in response to said failure, causes modification of forwarding data structure entries storing information pertaining to a first output adjacency affected by said failure;

code that, based on said modification, causes forwarding of protected traffic previously handled by said first output adjacency via a backup tunnel employing a second output adjacency; and a computer-readable storage medium that stores the codes; and wherein a time required for said modification is independent of a number of protected tunnels employing said first output adjacency and independent of a number of protected forwarding equivalence classes employing said first output adjacency and wherein a first output interface hosts only said first output adjacency and no other adjacencies and a second output interface hosts only said second output adjacency and no other adjacencies.

11. A network device incorporating capability for handling a failure, said network device comprising:

a processor system;

a memory system storing instructions to be executed by said processor system, said instructions comprising:

code that causes detection of said failure;

code that, in response to said failure, causes modification of forwarding data structure entries storing information pertaining to a first output adjacency affected by said failure; and code that, based on said modification, causes forwarding of protected traffic previously handled by said first output adjacency via a backup tunnel employing a second output adjacency; and wherein a time required for said modification is independent of a number of protected tunnels employing said first output adjacency and independent of a number of protected forwarding equivalence classes employing said first output adjacency;

wherein said network device employs a distributed forwarding architecture wherein forwarding processing is divided between an ingress linecard and an egress linecard and said code that causes forwarding data structure entries further comprises: code on each linecard of said router that causes modification of a forwarding data structure entry that previously specified said first output adjacency to now specify said second output adjacency and a linecard hosting said second output adjacency.

12. The network device of claim 11 wherein said code that causes modification of forwarding data structure entries comprises:

code that causes modification of a table entry specific to said first adjacency to indicate a failed status.

13. The network device of claim 11 wherein said first output adjacency and said second output adjacency are hosted on a single linecard.

14. The network device of claim 11 wherein said first output adjacency and said second output adjacency are hosted on different linecards.

15. A network device incorporating capability for handling a failure, said network device comprising:

a processor system;

a memory system storing instructions to be executed by said processor system, said instructions comprising:

code that causes detection of said failure;

code that, in response to said failure, causes modification of forwarding data structure entries storing information pertaining to a first output adjacency affected by said failure; and code that, based on said modification, causes forwarding of protected traffic previously handled by said first output adjacency via a backup tunnel employing a second output adjacency; and wherein a time required for said modification is independent of a number of protected tunnels employing said first output adjacency and independent of a number of protected forwarding equivalence classes employing said first output adjacency and wherein a first output interface hosts only said first output adjacency and no other adjacencies and a second output interface hosts only said second output adjacency and no other adjacencies.

* * * * *